May 20, 1941. J. KOLBE 2,242,584
AUTOMOTIVE VEHICLE
Filed Aug. 18, 1939   3 Sheets-Sheet 1

INVENTOR
Joachim Kolbe.
BY
Pile, Calver & Gray.
ATTORNEYS.

May 20, 1941.   J. KOLBE   2,242,584
AUTOMOTIVE VEHICLE
Filed Aug. 18, 1939   3 Sheets-Sheet 2

INVENTOR
Joachim Kolbe.
BY Pike, Calver & Gray.
ATTORNEYS.

May 20, 1941.                J. KOLBE                    2,242,584
                         AUTOMOTIVE VEHICLE
                    Filed Aug. 18, 1939        3 Sheets-Sheet 3

INVENTOR.
Joachim Kolbe
BY

Patented May 20, 1941

2,242,584

UNITED STATES PATENT OFFICE 2,242,584

AUTOMOTIVE VEHICLE

Joachim Kolbe, Detroit, Mich.

Application August 18, 1939, Serial No. 290,800
In Germany August 20, 1938

13 Claims. (Cl. 280—124)

This invention relates to vehicles, and more particularly to motor vehicles having bodies or superstructures which are so mounted on wheel supporting means or axles that the body or superstructure may assume an inclined or banked position when subjected to lateral forces, such for example as the centrifugal force developed as the vehicle rounds a curve. The invention also contemplates a vehicle having a body or superstructure so mounted on wheel supporting means or axles that the body or superstructure will be maintained in a normal or level position, or prevented from assuming an outwardly inclined position as the vehicle rounds a curve.

In certain vehicles of this general type such for example as that disclosed in my co-pending application Serial No. 223,743, filed August 8, 1938, the body or superstructure is so mounted on wheel supporting means or axles by longitudinally spaced connecting means that the body or superstructure is free to assume an inclined or banked position, when subjected to lateral or centrifugal forces. To insure substantially uniform movement of longitudinally spaced points of the superstructure to substantially the same inclined position, it has been found desirable in certain types of installation to provide means carried by the frame interconnecting the longitudinally spaced connecting means between the body and the wheel supporting means.

This invention contemplates an arrangement whereby the longitudinal frame members of the chassis or body may be employed to transmit uniform angular movement to the means interposed between the body and the wheel supporting means.

An object of this invention is therefore to provide a vehicle having novel interconnected longitudinally spaced connecting means between the superstructure or body and the wheel supporting means whereby the superstructure will be restrained against outward rotational movement about its longitudinal axis when subjected to lateral forces.

Another object is to provide a vehicle having longitudinally extending frame members interconnecting spaced connecting means between the superstructure and wheel supporting means whereby substantially uniform movement may be imparted to the spaced connecting means.

A further object of the invention is to provide a vehicle having rotatable longitudinally extending frame members, and a plurality of transversely extending body receiving frame members carried by the longitudinally extending frame members.

Another object is to provide a vehicle having longitudinally extending rotatable means to equalize angular movement of longitudinally spaced body supporting means.

Yet a further object of the invention is to provide resilient means operably connected to a longitudinally extending rotatable member interconnecting front and rear body banking means to maintain the body in the normal or generally upright position.

Another object is to provide a vehicle having a body mounted on transversely extending frame members which are supported on longitudinally extending frame members to transmit the load of the body to front and rear wheel supporting means, and to equalize movements of front and rear body banking control means.

Still another object of the invention resides in the provision of a vehicle having a superstructure so mounted on wheel supporting means that it is free to assume an inclined position when subjected to lateral forces, and wherein longitudinally extending frame members are mounted in a novel and improved manner to insure uniform movement of spaced parts of the superstructure relative to the wheel supporting means.

Other objects and advantages of this invention will be apparent from the following detailed description, considered in connection with the accompanying drawings, submitted for purposes of illustration only and not intended to define the scope of the invention, reference being had for that purpose to the subjoined claims.

In the drawings wherein similar reference characters refer to similar parts throughout the several views.

Before explaining in detail the present invention it is to be understood that the invention is not limited to its application to the details of construction and arrangemment of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Figure 1:
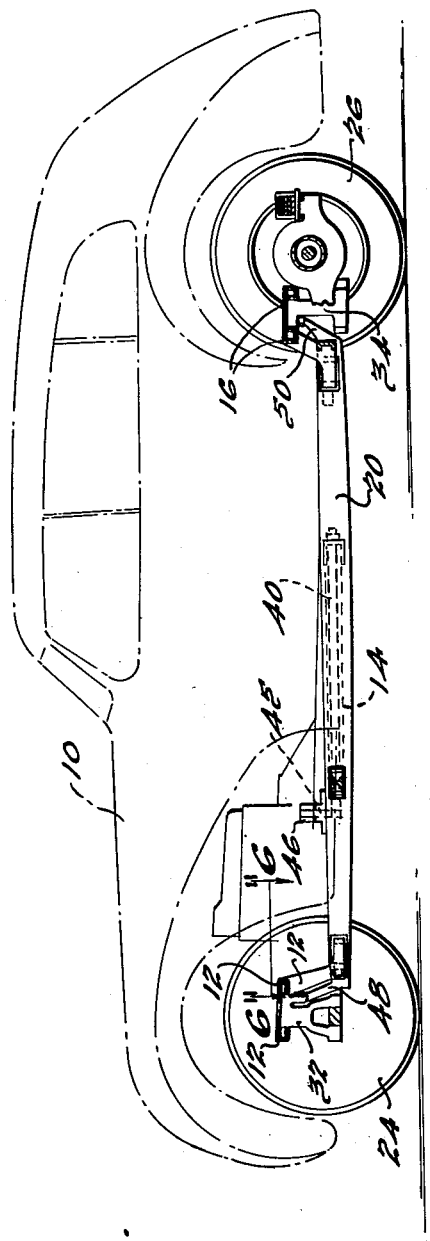
Figure 1 is a side elevation, partly in section, of a vehicle embodying the present invention.
Figure 2:
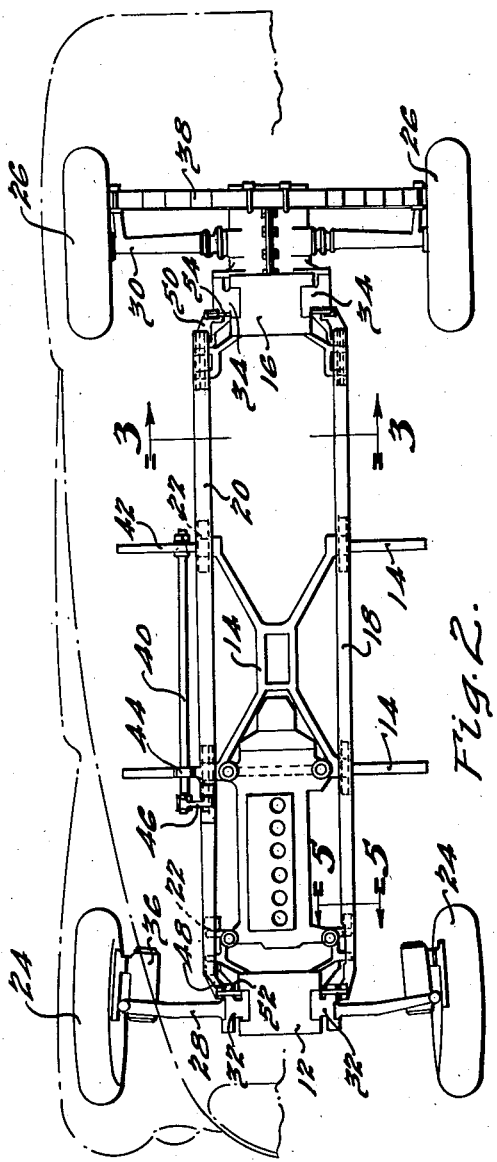
Figure 2 is a plan view of the vehicle illustrated in Figure 1.
Figure 3:
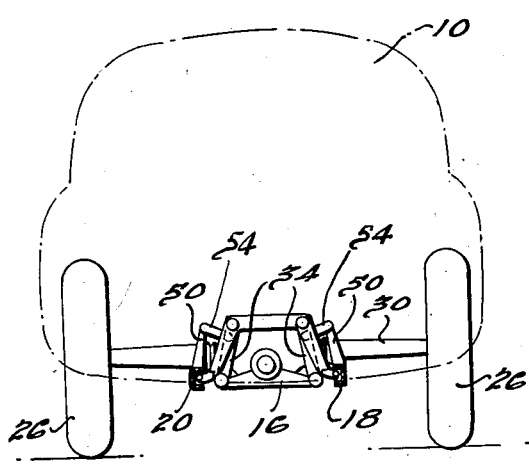
Figure 3 is a sectional view taken substantially on the line 3—3 of Figure 2.

Referring now to Figures 1 and 2, the invention is illustrated as embodied in a vehicle having a body or superstructure 10. The superstructure 10 may be mounted on a frame comprising generally transversely extending members 12, 14 and 16, which in turn are supported by longitudinally extending frame members 18 and 20.

If desired the transversely extending frame members 12, 14 and 16 may be formed integral with the superstructure 10 thereby forming a so-called frameless vehicle.

The longitudinally extending frame members 18 and 20 are preferably supported in resilient bushings 22 carried by the transversely extending members 12, 14 and 16 whereby the longitudinally extending members may rotate, as more fully described hereinafter.

Front and rear road engaging wheels 24 and 26 respectively are mounted on front and rear wheel supporting means or axles 28 and 30 respectively. It will be understood that the wheel supporting means may take any desired form, such for example as rigid axles or independent wheel suspension means whereby each of the wheels is free to move independently or semi-independently of movement of the other wheels in a known manner. Resilient means may be provided to resiliently absorb vertical shock or impulses to which the wheels may be subjected. These resilient means may take any desired form, such for example as a so-called Dubonnet independent suspension 36 illustrated in Figure 2; coiled generally vertically extending springs carried as for example by wishbone arms, or the transversely extending spring means 38 illustrated in Figures 1 and 2.

Figure 4:
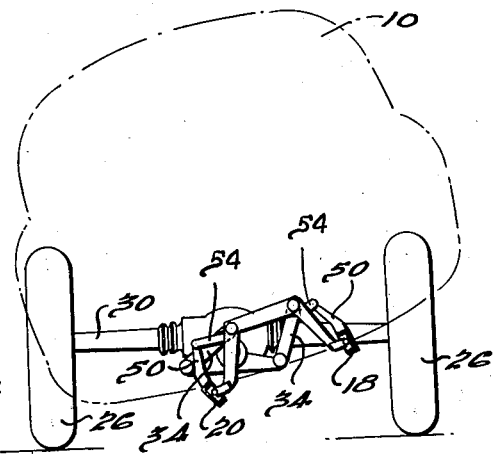
Figure 4 is a view similar to Figure 3 showing the body or superstructure in an inclined or banked position.
Figure 5:
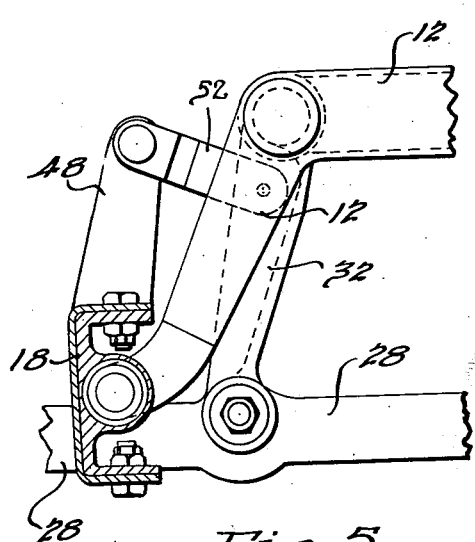
Figure 5 is a sectional view taken substantially on the line 5—5 of Figure 2.
Figure 6:
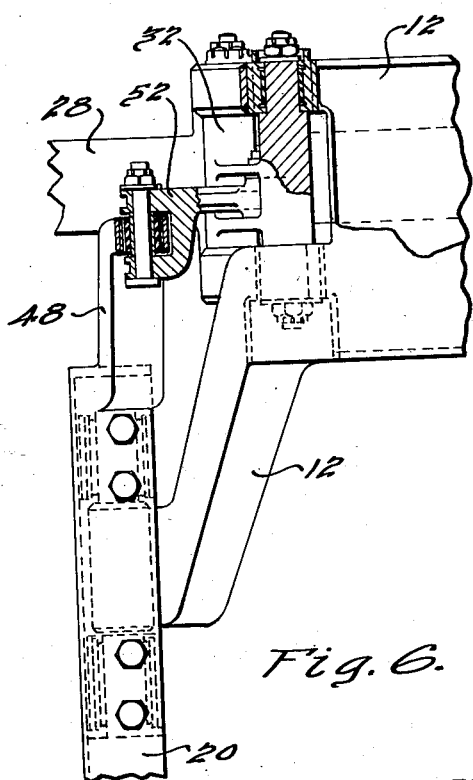
Figure 6 is a sectional view taken substantially on the line 6—6 of Figure 1, showing a somewhat modified form of the invention.
Figure 7:
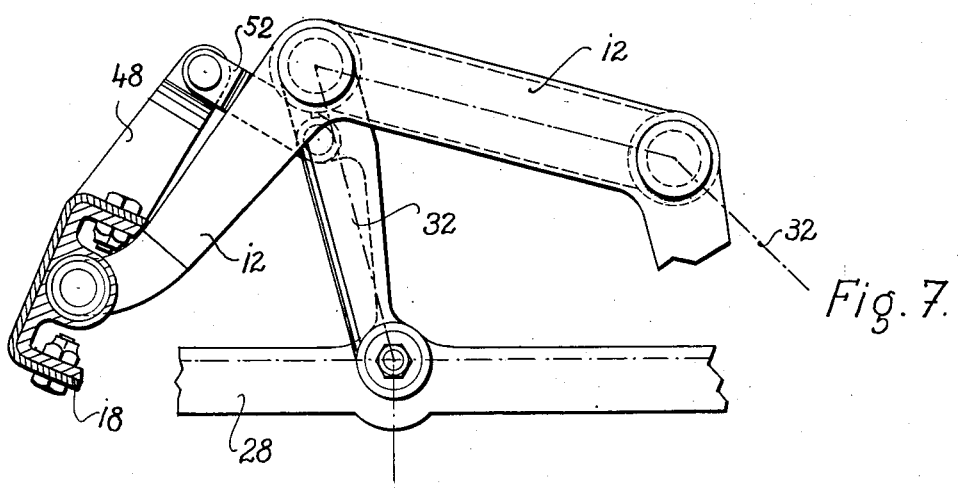
Figure 7 is a view similar to Figure 5 illustrating the position the linkage occupies when shifted to the left.
Figure 8:
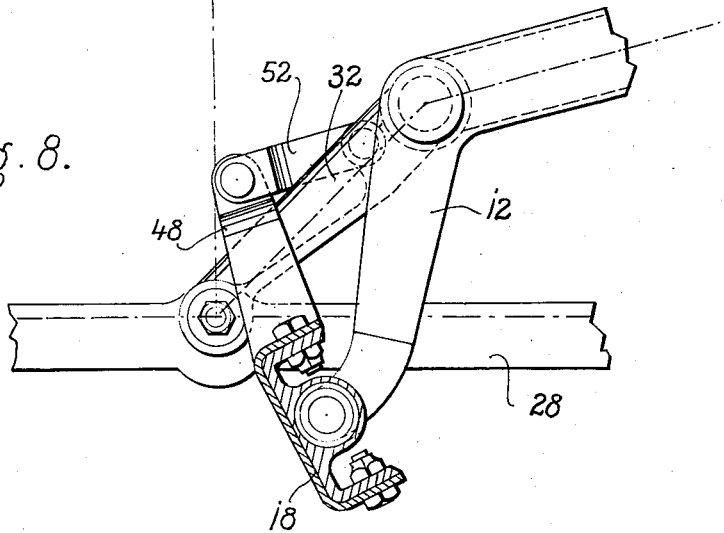
Figure 8 is a view similar to Figure 5 illustrating the position the linkage occupies when shifted to the right.

Connecting means, such for example as paired angularly inclined front and rear link members 32 and 34 respectively, may be interposed between the wheel supporting means 28 and 30, and the generally transversely extending frame members 12 and 16 as illustrated. These link members 32 and 34 permit the body or superstructure 10 to move laterally to an inclined or banked position when subjected to lateral force, as more clearly illustrated in Figure 4.

In order to insure substantially uniform movement of longitudinally spaced points of the superstructure, the front and rear link members 32 and 34 may be interconnected. One desirable form of interconnection comprises employing the longitudinally extending frame member 20 which may be operably connected to the front and rear links 32 and 34 by means of front and rear angularly inclined arms 48 and 50 respectively carried by one or both of the frame members 18 and 20. These arms may be operably connected to the front and rear link members 32 and 34 by means of front and rear shackles 52 and 54 respectively.

In the operation of this device, as the superstructure 10 assumes an inclined or banked position relative to the wheel supporting means, the longitudinally extending frame member 20 rotates about its longitudinal axis and operates through the front and rear arms 48 and 50 respectively, and the front and rear shackles 52 and 54 respectively to impart substantially uniform movement to the front and rear links 32 and 34 respectively.

Means may be employed to resiliently urge the superstructure toward the normal or upright position. One desirable form of superstructure return resilient means comprises a torsion bar 40 adapted to exert a force on one of the longitudinal frame members 18 or 20 to rotate it to exert a force on the links 32 and 34 to return the superstructure to the normal or upright position. One end of the bar 40 may be fixed in an arm 42 carried by the transversely extending frame members 14. The other end of the torsion bar 40 may be supported in a bushing carried by an arm 44 carried by the transversely extending frame members 14 but spaced longitudinally of the arm 42. The end of the torsion bar 40 supported in the bushing carried by the arm 44 may be operably connected by means of vertical lever 45 and a shackle 46 to one of the longitudinally extending rotatable frame members 20 to exert a force thereon to move the superstructure 10 back to the normal or generally upright position when it is displaced by a lateral force exerted on the vehicle, as when the vehicle rounds a curve.

I claim:

1. In a vehicle having front and rear wheel supporting means, a superstructure including a frame member, transversely movable connecting means between the frame member and front and rear wheel supporting means whereby the superstructure may shift laterally and assume an inclined or banked position relative to the wheel supporting means when subjected to lateral forces, and connecting means including a portion of said frame member operably connected to the front and rear transversely movable connecting means and operably lateral shifting of the superstructure to a banked position to equalize movement of said front and rear transversely movable connecting means.

2. In a vehicle having front and rear wheel supporting means, a body including a frame structure having longitudinally and transversely extending members, angularly movable connecting means between the transversely extending frame members and the front and rear wheel supporting means whereby the superstructure may assume an inclined or banked position when subjected to lateral forces, and connecting means including the longitudinally extending frame members operably connected to the front and rear angularly movable connecting means and operable by movement to a banked position to induce them to move angularly in unison.

3. A vehicle comprising front and rear wheel supporting means, a superstructure including a rotatably mounted longitudinally extending member, front and rear connecting means between the wheel supporting means and superstructure whereby the superstructure may shift laterally and assume an inclined or banked position relative to the wheel supporting means when subjected to lateral forces, and means operated by rotational movement of said longitudinally extending member to induce the front and rear connecting means to move substantially in unison.

4. In a vehicle having front and rear wheel supporting means, a frame having longitudinally extending members, front and rear transversely movable connecting means between the wheel supporting means and frame including paired angularly inclined links whereby the frame may assume an inclined or banked position when subjected to lateral forces, and means including at least one of said longitudinally extending members operably connected to the front and rear links and operable by movement of the frame to an angularly inclined position to induce the front and rear links to move substantially in unison.

5. In a vehicle having front and rear wheel supporting means, a frame having longitudinally extending members, front and rear connecting means between the wheel supporting means and frame including paired transversely movable angularly inclined links whereby the frame may shift laterally and assume an inclined or banked position when subjected to lateral forces, means interconnecting the front and rear transversely movable link connecting means including at least one of said longitudinally extending members and operable by movement of the frame to a banked position to induce the front and rear link connecting means to move substantially in unison, and resilient means associated with one of said longitudinally extending members to induce the frame to return to a substantially normal or upright position as the forces inducing movement from the normal or generally upright position decrease.

6. In a vehicle having front and rear wheel supporting means, a frame including longitudinally and transversely extending frame members, a superstructure mounted on the transversely extending frame members, connecting means between the wheel supporting means and transversely extending frame members whereby the superstructure may assume an inclined or banked position relative to the wheel supporting means when subjected to lateral forces, connecting means between the longitudinally extending frame members and the transversely extending frame members whereby the longitudinally extending frame members may rotate in the transverse frame members, and means operably connected to one of said longitudinally extending frame members to impart rotative movement thereof to the connecting means between the front and rear wheel supporting means and the transversely extending frame members to impart substantially uniform movement to said connecting means.

7. A vehicle comprising front and rear wheel supporting means, a superstructure including transversely and longitudinally extending frame members, front and rear connecting means between the wheel supporting means and transversely extending frame members of the superstructure whereby the superstructure may assume an inclined or banked position relative to the wheel supporting means when subjected to lateral forces, and means including one of said longitudinally extending frame members operably connected to the connecting means and operable by movement of the superstructure to an inclined or banked position to rotate said longitudinal frame member to induce the front and rear connecting means to move in the same direction and to substantially the same amount.

8. In a vehicle having front and rear wheel supporting means, a superstructure having a rotatably mounted longitudinally extending frame member carried by the wheel supporting means and adapted to shift laterally and assume an inclined or banked position relative to the wheel supporting means when subjected to lateral forces, and means operable by rotational movement of said longitudinally extending frame member as the superstructure shifts laterally and assumes an inclined or banked position to maintain the wheel supporting means in substantially the same relative position laterally with respect to the superstructure.

9. In a vehicle having front and rear wheel supporting means, a frame having a rotatable longitudinally extending member operably connected to the front and rear wheel supporting means and adapted to shift laterally and assume an inclined or banked position relative to the wheel supporting means when subjected to lateral forces, and means operable by rotative movement of the longitudinally extending member as the frame moves to an inclined or banked position to maintain the frame in substantially the same angular relation relative to the front and rear wheel supporting means.

10. A vehicle comprising front and rear wheel supporting means, a frame having transversely extending members and rotatable longitudinally extending members, a superstructure mounted on the transverse frame members, front and rear connecting means comprising angularly inclined links between the front and rear wheel supporting means and transversely extending members of the frame whereby the superstructure may assume an inclined or banked position relative to the wheel supporting means when subjected to predetermined centrifugal forces, and said longitudinally extending frame members interconnecting the front and rear angularly inclined links to rotate as the superstructure assumes a banked position to induce said front and rear links to move substantially in unison as the superstructure is moved to an inclined or banked position.

11. A vehicle comprising front and rear wheel supporting means, a frame having transversely and longitudinally extending members, a superstructure mounted on the transverse frame members, resilient means between the superstructure and wheels to absorb vertical impulses to which the wheels are subjected, front and rear connecting means comprising angularly inclined links between the wheel supporting means and transverse frame members whereby the superstructure may assume an inclined or banked position relative to the wheel supporting means when subjected to predetermined centrifugal forces, and means including the longitudinally extending frame members interconnecting the front and rear connecting means to induce the front and rear wheel supporting means to maintain substantially the same angularity relative to the superstructure.

12. In a vehicle having front and rear wheel supporting means, a superstructure including a longitudinally extending rotatable frame member, front and rear connecting means comprising paired angularly inclined links interposed between the superstructure and wheel supporting means whereby the superstructure may shift laterally and assume an inclined or banked position relative to the wheel supporting means when subjected to lateral forces, and motion transmitting means operably connecting the front and rear links to said longitudinally extending rotatable frame member to rotate said member as the superstructure shifts laterally to a banked position to induce the front links to move substantially in unison with the rear links.

13. A vehicle comprising front and rear axles, steerable and non-steerable wheels carried by the axles, a superstructure including a longitudinally extending rotatable member, resilient means between the superstructure and wheels to absorb vertical shocks, front and rear connecting means comprising angularly inclined links interposed between the axles and superstructure whereby the superstructure may shift laterally and assume an inclined or banked position accompanied by a lowering of its center of gravity when subjected to predetermined lateral forces, motion transmitting means operably connecting the front and rear links to said longitudinally extending rotatable member to induce the front links to move with the rear links as the superstructure shifts laterally to assume a banked position, and resilient means associated with said rotatable member to urge the superstructure to return to the normal position.

JOACHIM KOLBE.